(12) United States Patent
Choon (10) Patent No.: US 7,535,600 B2
(45) Date of Patent: May 19, 2009

(54) IMAGING DEVICE AND ITS DRIVING METHOD

(75) Inventor: Eng Meng Choon, Choa Chu Kang (SG)

(73) Assignee: Seiko Epson Corporation, Tokyo (JP)

( * ) Notice: Subject to any disclaimer, the term of this patent is extended or adjusted under 35 U.S.C. 154(b) by 1055 days.

(21) Appl. No.: 10/854,543

(22) Filed: May 25, 2004

(65) Prior Publication Data
US 2005/0024696 A1 Feb. 3, 2005

(30) Foreign Application Priority Data
May 26, 2003 (JP) .................. P. 2003-147704

(51) Int. Cl.
*H04N 1/04* (2006.01)
(52) U.S. Cl. .................. 358/474; 358/518; 358/513; 348/272; 348/273; 348/E3.019; 348/E3.022
(58) Field of Classification Search .......... 358/474, 358/475, 512–518, 408, 446, 509; 348/272, 348/273, 275, E3.019
See application file for complete search history.

(56) References Cited

U.S. PATENT DOCUMENTS

| 5,031,048 A * | 7/1991 | Naruto et al. ............... 348/296 |
| 5,416,611 A * | 5/1995 | Tandon ....................... 358/474 |
| 5,486,850 A * | 1/1996 | Nakamura ..................... 347/24 |
| 6,018,563 A * | 1/2000 | Arai et al. ..................... 378/39 |
| 6,198,550 B1 * | 3/2001 | Toyoda ........................ 358/514 |
| 6,813,040 B1 * | 11/2004 | Uchino et al. ................. 358/1.9 |
| 6,819,799 B1 * | 11/2004 | Sakaguchi ................... 382/235 |
| 6,961,158 B2 * | 11/2005 | Spears ........................ 358/513 |
| 7,027,193 B2 * | 4/2006 | Spears et al. ................. 358/471 |
| 7,034,969 B2 * | 4/2006 | Watanabe .................... 358/513 |
| 7,224,500 B2 * | 5/2007 | Konagaya .................... 358/475 |
| 7,349,134 B2 * | 3/2008 | Kato .......................... 358/482 |
| 2004/0212708 A1 * | 10/2004 | Spartiotis et al. ............ 348/295 |
| 2005/0141048 A1 * | 6/2005 | Mizutani ..................... 358/474 |
| 2006/0028578 A1 * | 2/2006 | Tanimoto et al. ............ 348/362 |

FOREIGN PATENT DOCUMENTS

| JP | 03-217057 | 9/1991 |
| JP | 2001-111892 | 4/2001 |

OTHER PUBLICATIONS

Japanese Office Action (dated Sep. 4, 2006).

* cited by examiner

*Primary Examiner*—Negussie Worku
(74) *Attorney, Agent, or Firm*—Edwards Angell Palmer & Dodge LLP; John J. Penny, Jr.

(57) ABSTRACT

An imaging device includes: a plurality of light receiving parts for generating electric charge by photoelectric conversion; a shift register for transferring the electric charge generated by the plurality of light receiving parts to the output-side end portion of the shift register; and an electric-charge discharge portion which is provided in a midway-portion of the shift register and includes an electric-charge discharge gate for controlling import of the electric charge from the shift register for discharging the electric charge of the shift register via the electric-charge discharge gate.

5 Claims, 10 Drawing Sheets

IMAGING DEVICE AND ITS DRIVING METHOD

BACKGROUND OF THE INVENTION

The present invention relates to an imaging device and its driving method.

Heretofore, imaging devices such as CCD image sensors have widely been employed in image scanners, facsimiles, digital cameras and so forth. The imaging device is equipped with a shift register for serially transferring electric charge stored in a plurality of light receiving parts. Before signal charge is stored in the light receiving parts, a gate provided between the light receiving parts and the shift register is opened so that the electric charge is transferred in unison from the light receiving parts to the shift register as an unnecessary electric charge. Thereby, the image reading speed can be increased by efficiently discharging the unnecessary electric charge thus transferred to the shift register (see JP-A-2001-111892, for example).

SUMMARY OF THE INVENTION

An object of the invention is to provide an imaging device so designed as to discharge the unnecessary electric charge of a shift register in a short time and its driving method.

In order to achieve the above object, the present invention is characterized by having the following arrangement.

(1) An imaging device comprising:

a plurality of light receiving parts for generating electric charge by photoelectric conversion;

a shift register for transferring the electric charge generated by the plurality of light receiving parts to the output-side end portion of the shift register; and an electric-charge discharge portion which is provided in a midway-portion of the shift register and includes an electric-charge discharge gate for controlling import of the electric charge from the shift register for discharging the electric charge of the shift register via the electric-charge discharge gate.

(2) An imaging device according to (1), wherein the electric-charge discharge portion is provided in a central portion of the shift register.

(3) An imaging device according to (1), wherein a plurality of electric-charge discharge portions are provided in the midway-portion of the shift register.

(4) A method of driving an imaging device including: a plurality of light receiving parts for generating electric charge by photoelectric conversion; a shift register for transferring the electric charge generated by the plurality of light receiving parts to the output-side end portion of the shift register; and an electric-charge discharge portion which is provided in a midway-portion of the shift register and includes an electric-charge discharge gate for controlling import of the electric charge from the shift register for discharging the electric charge of the shift register via the electric-charge discharge gate, the method comprising the steps of:

shutting off the electric-charge discharge gate when the electric charge stored in the plurality of light receiving parts is transferred by the shift register within an open-shutter period; and opening the electric-charge discharge gate when the electric charge stored in the plurality of light receiving parts is transferred by the shift register outside the open-shutter period.

(5) A method of driving an imaging device a plurality of light receiving parts for generating electric charge by photoelectric conversion; a shift register for transferring the electric charge generated by the plurality of light receiving parts to the output-side end portion of the shift register; and an electric-charge discharge portion which is provided in a midway-portion of the shift register and includes an electric-charge discharge gate for controlling import of the electric charge from the shift register for discharging the electric charge of the shift register via the electric-charge discharge gate, the method comprising the steps of:

shutting off the electric-charge discharge gate in such an operating mode that the electric charge generated by substantially all of the plurality of light receiving parts is utilized when the electric charge. stored in the plurality of light receiving parts is transferred by the shift register within the open-shutter period; and opening the electric-charge discharge gate in such an operating mode that the electric charge generated by the plurality of light receiving parts is partially utilized when the electric charge stored in the plurality of light receiving parts is transferred by the shift register within the open-shutter period.

DETAILED DESCRIPTION OF PREFERRED EMBODIMENTS

Embodiments according to the invention will be described with reference to the drawings.

First Embodiment

Figure 2:
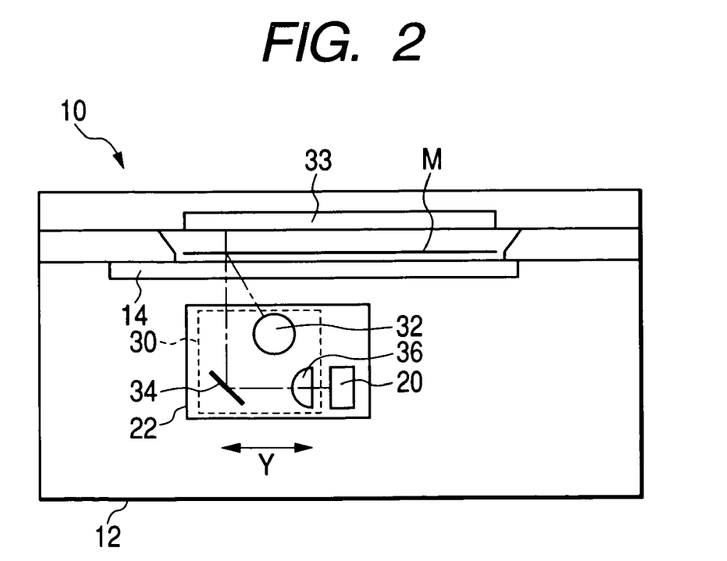
FIG. 2 is a schematic diagram showing the structure of an image scanner according to the first embodiment of the invention.

FIG. 2 is a schematic diagram showing the structure of an image scanner 10 having a linear image sensor 20 as an imaging device according to a first embodiment of the invention. The image scanner 10 is a flat bed type and equipped with an original table 14 set in the upper part of a case 12. The original table 14 is formed with a transparent plate such as a glass plate and a reflective original M such as printing paper or a transmissive original M such as a photographic film is placed and held on the top surface of the original table 14.

An optical system 30 is formed with light sources 32 and 33, a mirror 34, a condenser lens 36 and so on. The light source 32 for the reflective original is a tubular illuminator and loaded in a carriage 22 such that it is extended in the main scanning direction perpendicular to the plane of FIG. 2. The light source 33 for the transparent original is an area light source and can be installed above the original table 14. As shown by a chain line in FIG. 2, a reflected light image of the reflective original M irradiated by the light source 32 or a transmitted light image of the transmissive original M irradiated by the light source 33 is formed on the linear image sensor 20 by a mirror 34 and a condenser lens 36.

The linear image sensor 20 stores electric charge obtained by subjecting the received light to photoelectric conversion for a predetermined time and outputs an electric signal corresponding to the quantity of light received. Although a lens reduction type linear image sensor is used as the linear image sensor 20, a contact-type linear image sensor may also be usable. The linear image sensor 20 is loaded in the carriage 22 such that a plurality of light receiving parts are linearly arranged in the main scanning direction as will be described later.

The carriage 22 is housed in the case 12 so that it can reciprocate in parallel to the surface of the original table 14. The carriage 22 is loaded with the optical system 30 and the linear image sensor 20 and used to carry the linear image sensor 20 and the optical system 30 in a subscanning direction shown by Y in FIG. 2.

Figure 3:
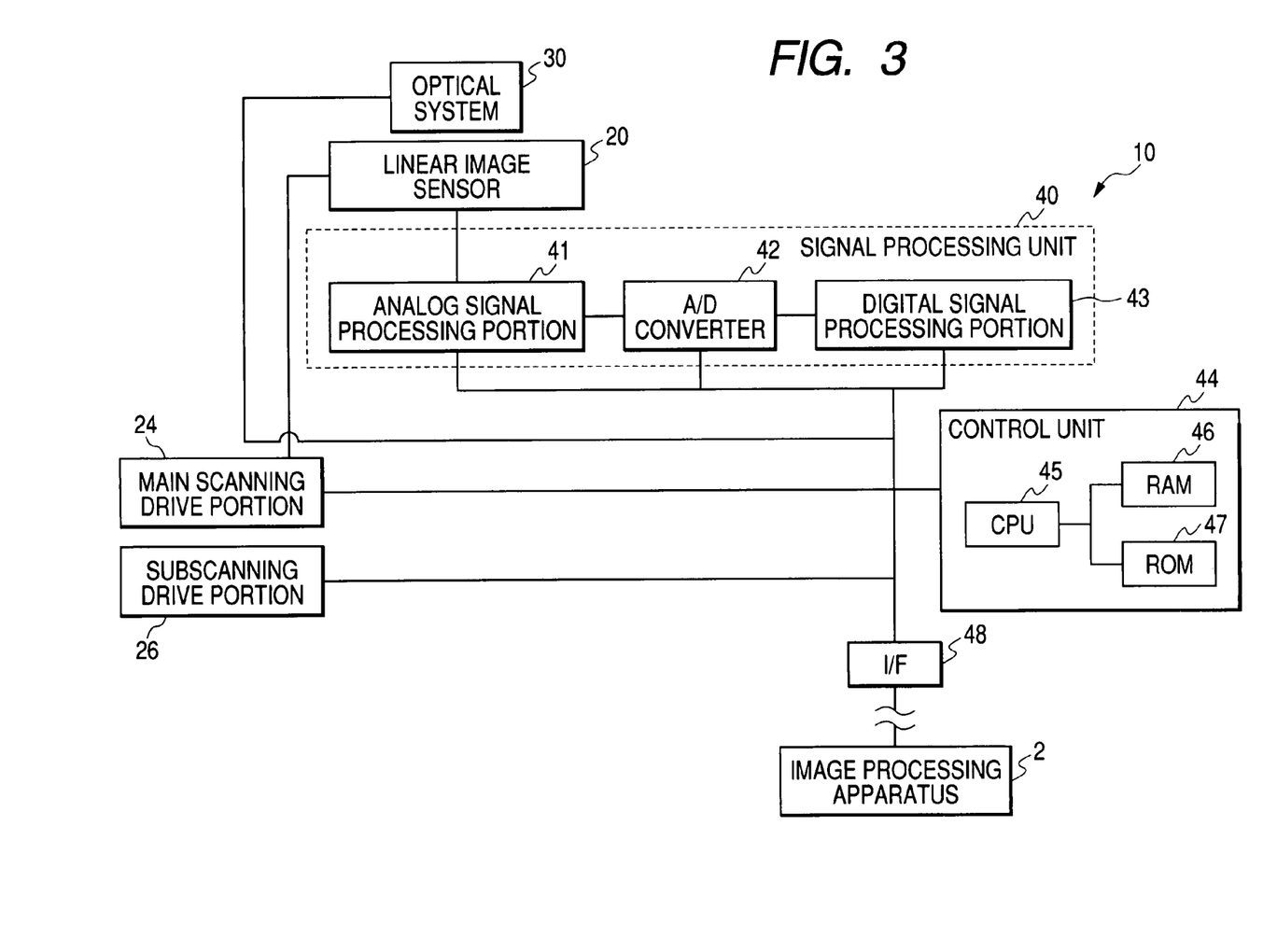
FIG. 3 is a block diagram showing the image scanner according to the first embodiment of the invention.

FIG. 3 is a block diagram of the image scanner 10. A main scanning drive portion 24 generates pulses necessary for driving the linear image sensor 20 and supplies the pulse to the linear image sensor 20. The main scanning drive portion 24 is formed with a synchronous signal generator, a driving timing generator and so on. A subscanning drive portion 26 is formed with a belt latched to the carriage 22, a motor for rotating the belt, with a gear train, a driving circuit and so on. When the subscanning drive portion 26 draws the carriage 22 by means of the belt, a scanning line extending in the main scanning direction moves in the subscanning direction, whereby the scanning of a two-dimensional image is made possible.

A signal processing unit 40 is formed with an analog signal processing portion 41, an A/D converter 42, a digital signal processing portion 43 and so on. The analog signal processing portion 41 subjects an analog signal outputted from the linear image sensor 20 to analog signal processing such as amplification and noise reduction processes and supplies the processed signal to the A/D converter 42. The A/D converter 42 quantizes the analog signal outputted from the analog signal processing portion 41 to a digital signal having predetermined gradation and supplies the quantized signal to the digital signal processing portion 43. The digital signal processing portion 43 subjects the image signal outputted from the A/D converter 42 to various kinds of processing such as shading correction, gamma correction and pixel interpolation and generates image data to be transferred to an image processing apparatus 2.

A control unit 44 has CPU 45, RAM 46 and ROM 47 and is connected via buses to the driving circuits of the light sources 32 and 33, the main scanning drive portion 24, the subscanning drive portion 26, the signal processing unit 40 and the like. The control unit 44 controls the light sources 32 and 33, the main scanning drive portion 24, the subscanning drive portion 26, the signal processing unit 40 and so on by executing the computer program stored in the ROM 47 in response to the command from the image processing apparatus 2.

An interface (I/F) 48 is connected via a bus to the control unit 44. The image processing apparatus 2 of a personal computer or the like is connected to the interface (I/F) 48 and image data generated in the signal processing unit 40 is transferred via the interface (I/F) 48 to the image processing apparatus 2.

Figure 1:
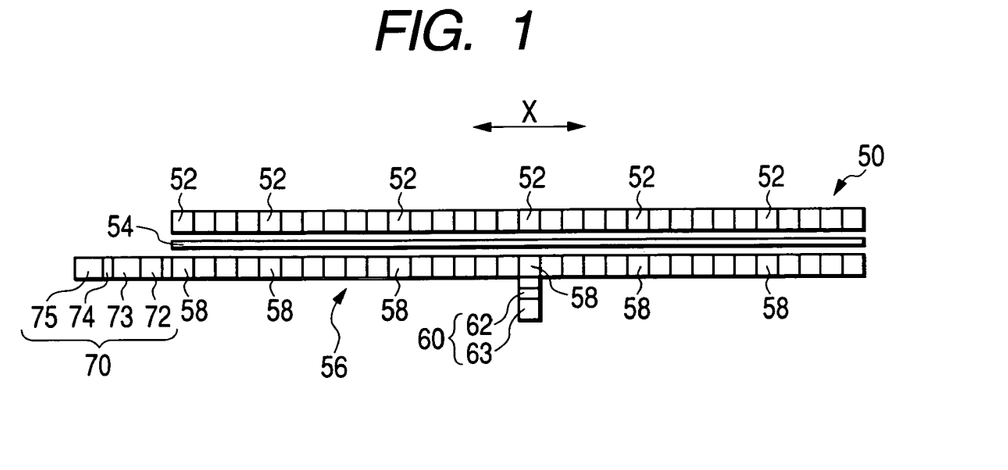
FIG. 1 is a schematic diagram showing the structure of a linear image sensor according to a first embodiment of the invention.

FIG. 1 is a schematic diagram showing the structure of the linear image sensor 20. The linear image sensor 20 is equipped with one or a plurality of sensor portions 50. In the case of the linear image sensor 20 for producing a color output, the sensor portion 50 is provided for each filter color. The sensor portion 50 is formed with a plurality of light receiving parts 52, a transfer gate 54, a CCD analog shift register (shift register) 56, an electric-charge discharge portion 60, an output portion 70 and so on.

The plurality of light receiving parts 52 in the sensor portion 50 are arranged in a line in the main scanning direction shown by X in FIG. 1. Each of the light receiving parts 52 is a photoelectric conversion element such as a photodiode and generates electric charge in proportion to the quantity of light received within a predetermined time by means of photoelectric conversion. In the case of the linear image sensor 20 for producing the color output, an on-chip filter is formed on the light receiving side of each light receiving part 52, which receives the light passed through the filter. Incidentally, primary color filters of R (Red), G (Green) and B (Blue), three complementary color filters of C (Cyan), M (Magenta) and Y (Yellow) or four complementary color filters of C, M, Y and G (Green) are used as the filters above. With respect to the color output method, a dichroic mirror method, a light source switching method or a filter switching method in addition to the on-chip method may also be usable.

The transfer gate 54 is provided along a line of light receiving parts 52. A transfer gate pulse φt is applied by the main scanning drive portion 24 to the transfer gate 54. The transfer gate 54 controls the charge accumulation time in each light receiving part 52 in response to the potential variation of the transfer gate pulse φt applied. In other words, the transfer gate 54 is shut off when the potential level of the transfer gate pulse φt is turned to the low side, whereby the electric charge generated in each light receiving part 52 is stored. Further, the transfer gate 54 is opened when the potential level of the transfer gate pulse φt is turned to the high side and the electric charge stored in each light receiving part 52 is transferred to the shift register.

The shift register 56 is provided opposite to the light-receiving-part-side of and along the transfer gate 54. Portions divided off by solid lines arranged at equal intervals in the main scanning direction X of the shift register 56 in FIG. 1 correspond to the light receiving parts by one to one and form potential well forming domains 58 for restraining the electric charge of the corresponding light receiving parts 52 to which a driving pulse φd is applied by the main scanning drive portion 24. Although a two-phase pulse is used as the driving pulse φd, a pulse of three-phase or greater may also be usable. The shift register 56 serially transfers the electric charge to an output portion 70 in response to the phase variation of the driving pulse φd applied to each domain 58 of the shift register 56.

The electric-charge discharge portion 60 is provided opposite to the transfer-gate-side of one domain 58 located in the substantially central portion of the shift register 56. The electric-charge discharge portion 60 has an electric-charge discharge gate 62 and a drain 63. A discharge gate pulse φe is applied by the main scanning drive portion 24 to the electric-charge discharge gate 62. The electric-charge discharge gate 62 controls the import of the electric charge from the shift register 56 into the electric-charge discharge portion 60 in response to the potential variation of the discharge gate pulse φe applied. The electric charge thus imported into the electric-charge discharge portion 60 is discharged from the drain 63 into the substrate.

The output portion 70 is provided to the end portion of the output of the shift register 56. The output portion 70 has an output gate 72, a floating capacitor 73, an output circuit (not shown), a reset gate 74 and a reset drain 75. A constant voltage is applied by the main scanning drive portion 24 to the output gate 72. The electric charge is transferred from the shift register 56 via the output gate 72 to the floating capacitor 73. The electric charge transferred to the floating capacitor 73 is detected by the output circuit and an electric signal corresponding to the electric charge thus detected is supplied from the output circuit to the signal processing unit 40. A reset gate pulse φr is applied by the main scanning drive portion 24 to the reset gate 74. The reset gate 74 controls the import of the electric charge from the floating capacitor 73 into the reset drain 75 in response to the potential variation of the reset gate pulse φr applied.

The electric charge (signal charge) processed in the signal processing unit 40 as an image signal is stored in the light receiving parts 52 within an open-shutter period. The electric charge stored in the light receiving parts 52 outside the open-shutter period (unnecessary electric charge) need not be processed in the signal processing unit 40. Although an electric shutter is used as the shutter, a mechanically-operating shutter may also be usable.

Figure 4:
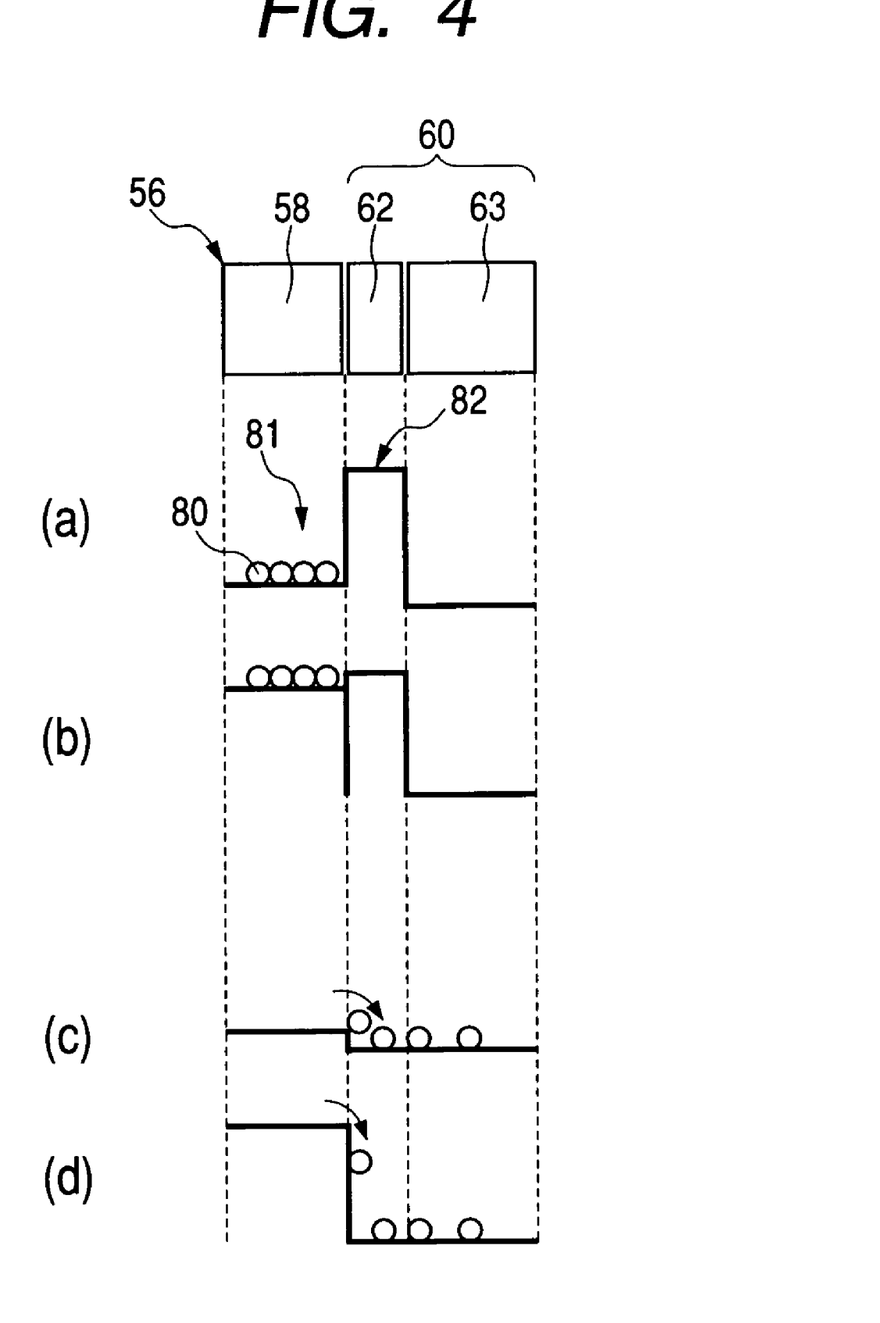
FIG. 4 is a schematic diagram showing how electric charge is discharged by an electric-charge discharge portion.
Figure 5:
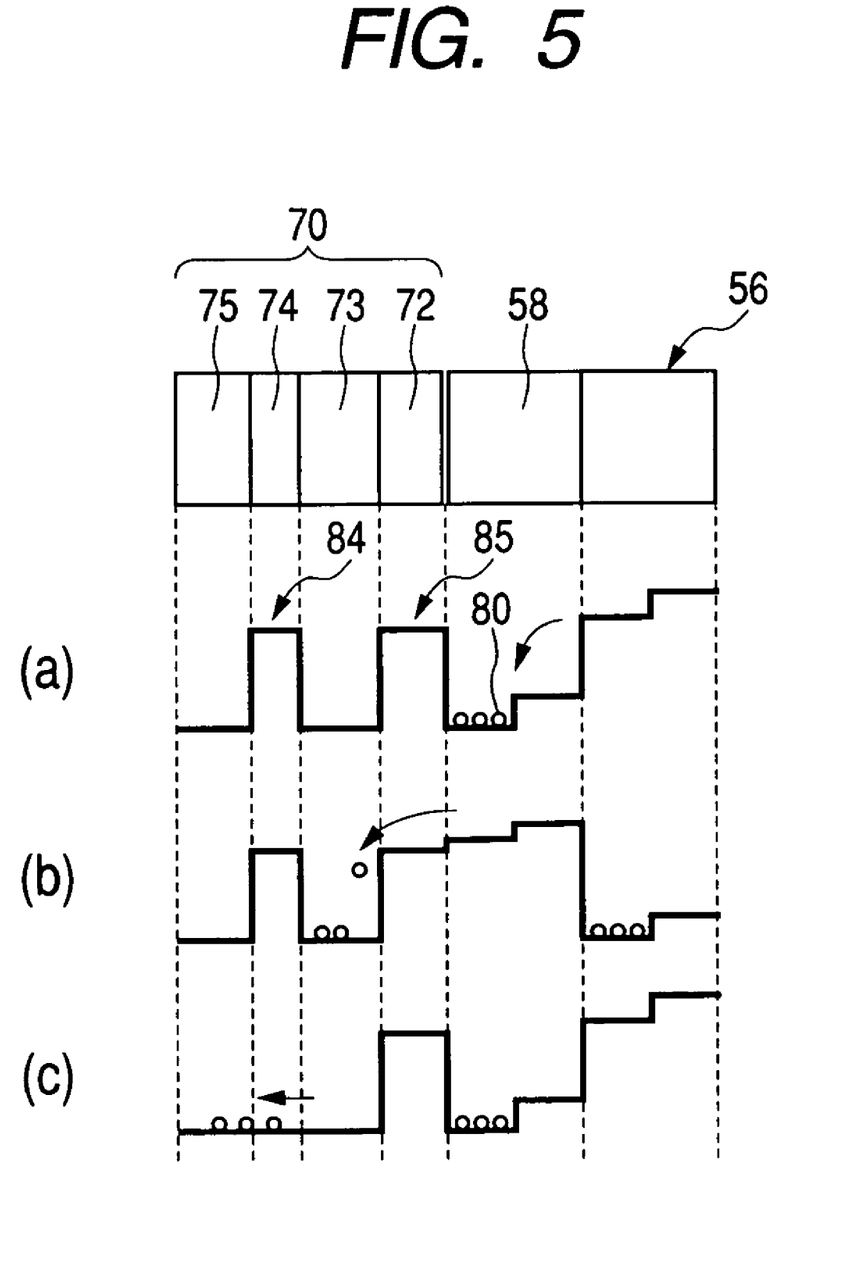
FIG. 5 is a schematic diagram showing how the electric charge is discharged by the electric-charge discharge portion.

FIGS. 4 and 5 are schematic diagrams showing how the electric charge is discharged by the electric-charge discharge portion 60 and the output portion 70. As shown in FIGS. 4 and 5, the electric charge is indicated by a plurality of particles 80.

Discharging the electric charge by the electric-charge discharge portion 60 will be described first by reference to FIG. 4. The electric-charge discharge gate 62 is shut off as follows. When the potential level of the discharge gate pulse φe applied to the electric-charge discharge gate 62 is turned to the low side, a potential barrier 82 higher than any base of a potential well 81 formed in the shift register 56 with every phase variation of the driving pulse φd is formed in the electric-charge discharge gate 62 as shown in FIGS. 4(a) and (b). Therefore, the electric charge restrained in the potential well 81 of the shift register 56 is unable to climb over the potential barrier 82 of the electric-charge discharge gate 62, so that no electric charge moves from the potential well 81 to the drain 63 lower in potential than the potential barrier 82.

The opening of the electric-charge discharge gate 62 is carried out as follows. When the potential level of the discharge gate pulse φe is turned to the high side, the potential barrier 82 formed at the electric-charge discharge gate 62 becomes lower than any base of the potential well 81 formed in the shift register 56 with every phase variation of the driving pulse φd as shown in FIGS. 4(c) and (d). Consequently, the electric charge restrained in the potential well 81 of the shift register 56 is allowed to go over the potential barrier 82 of the electric-charge discharge gate 62, imported into the electric-charge discharge portion 60 before being discharged from the drain 63.

Discharging the electric charge by the output portion 70 will be described then by reference to FIG. 5. When the potential level of the reset gate pulse φr applied to the reset gate 74 is turned to the low side, a potential barrier 84 higher in potential than the floating capacitor 73 is formed at the reset gate 74 as shown in FIGS. 5(a) and (b). Consequently, the electric charge transferred from the shift register 56 to the floating capacitor 73 after going over the potential barrier 85 of the output gate 72 in response to the phase variation of the driving pulse φd as shown in FIGS. 5(a) and (b) is unable to climb over the potential barrier 84 of the reset gate 74, so that the electric charge is retrained by the floating capacitor 73.

When the potential level of the reset gate pulse φr is switched to the high side, the potential barrier 84 formed at the reset gate 74 becomes lower in potential than the input of the floating capacitor 73 as shown in FIG. 5(c). Consequently, the electric charge retrained by the floating capacitor 73 goes over the potential barrier 84 of the reset gate 74 and is discharged from the substrate via the reset drain 75.

Figure 6:
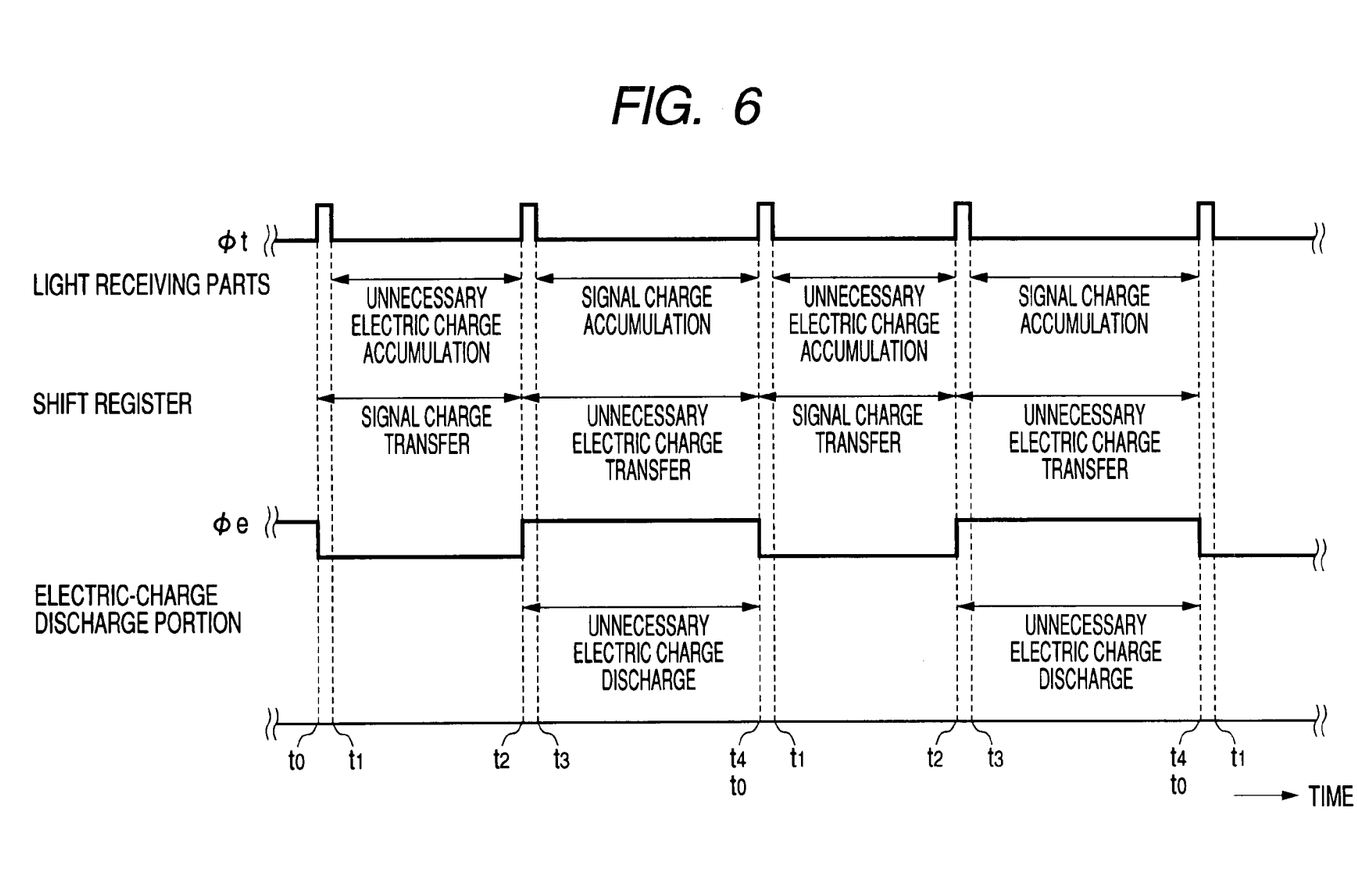
FIG. 6 is a time chart showing a driving method according to the first embodiment of the invention.

FIG. 6 is a time chart showing a method of driving the linear image sensor 20. The method of driving the linear image sensor 20 will now be described by reference to FIG. 6. In the following, a description will be given of performing a scan of one line of the linear image sensor 20 in each cycle which is defined as a period ranging from time $(t)=t_0$ when the accumulation of the signal charge is completed in each light receiving part 52 up to $t=t_4$ when the accumulation of the signal charge is completed again.

At $t=t_0$, the transfer gate 54 is opened by turning the potential level of the transfer gate pulse φt to the high side. The potential level of the transfer gate pulse φt is kept to the high side until $t=t_1$, whereby during a period of $t_0 \leq t < t_1$, the signal charge stored in each light receiving part 52 is transferred to the shift register 56. At $t=t_0$, moreover, the electric-charge discharge gate 62 is shut off by turning the potential level of the discharge gate pulse φe to the low side. The potential level of the discharge gate pulse φe is kept to the low side until $t=t_2$, whereby during a period of $t_0 \leq t < t_2$, any signal charge is transferred by the shift register 56 up to the output portion 70 without being discharged into the electric-charge discharge portion 60.

At $t=t_1$, the transfer gate 54 is shut off by turning the potential level of the transfer gate pulse φt to the low side. The potential level of the transfer gate pulse φt is kept to the low side until $t=t_2$, whereby during a period of $t_1 \leq t < t_2$, the unnecessary electric charge is stored in each light receiving part 52.

At $t=t_2$, the transfer gate 54 is opened by turning the potential level of the transfer gate pulse φt to the high side. The potential level of the transfer gate pulse φt is kept to the high side until $t=t_3$, whereby during a period of $t_2 \leq t < t_3$, the undesired signal charge stored in each light receiving part 52 is transferred to the shift register 56. At $t=t_2$, moreover, the electric-charge discharge gate 62 is opened by turning the potential level of the discharge gate pulse φe to the high side. The potential level of the discharge gate pulse φe is kept to the high side until $t=t_4$, whereby during a period of $t_2 \leq t < t_4$, the unnecessary electric charge existing from the central portion of the shift register 56 to the non-output-side end portion of the shift register 56 is discharged into the electric-charge discharge portion 60. During the period of $t_2 \leq t < t_4$, the rest of the unnecessary electric charge, that is, the unnecessary electric charge existing from the central portion of the shift register 56 to the non-output-side end portion of the shift register 56 is transferred up to the floating capacitor 73 and discharged via the reset drain 75.

At $t=t_3$, the transfer gate 54 is shut off by turning the potential level of the transfer gate pulse φt to the low side. The potential level of the transfer gate pulse φt is kept to the low side until $t=t_4$, whereby during a period of $t_3 \leq t < t_4$, the signal charge is stored in each light receiving part 52. In other words, the period of $t_3 \leq t < t_4$ is equivalent to the open-shutter period.

At $t=t_4$, the potential level of the transfer gate pulse φt is turned to the high side, whereas the potential level of the discharge gate pulse φe is turned to the low side. More specifically, the potential level variations of the pulses φt and φe at $t=t_4$ are set as those of the pulses φt and φe at the next $t=t_0$.

According to the method of driving the linear image sensor 20 like this, one line of signal charge can totally be transferred up to the output-side end portion of the shift register 56 by shutting off the electric-charge discharge gate 62 during the period of $t_0 \leq t < t_2$ in which the signal charge generated by each light receiving part 52 is transferred by the shift register 56. On the other hand, during the period of $t_2 \leq t < t_4$ in which the unnecessary electric charge generated by each light receiving part 52 is transferred by the shift register 56, the unnecessary electric charge existing from the central portion of the shift register 56 to the non-output-side end portion of the shift register 56 is discharged from the electric-charge discharge portion 60 by opening the electric-charge discharge gate 62. Consequently, what is needed to be transferred up to the reset drain 75 of the output portion 70 before being discharged is the unnecessary electric charge existing from the central portion to the output-side end portion of the shift register 56. Therefore, the time required to discharge the unnecessary electric charge is reduced to substantially one half.

Second Embodiment

Figure 7:
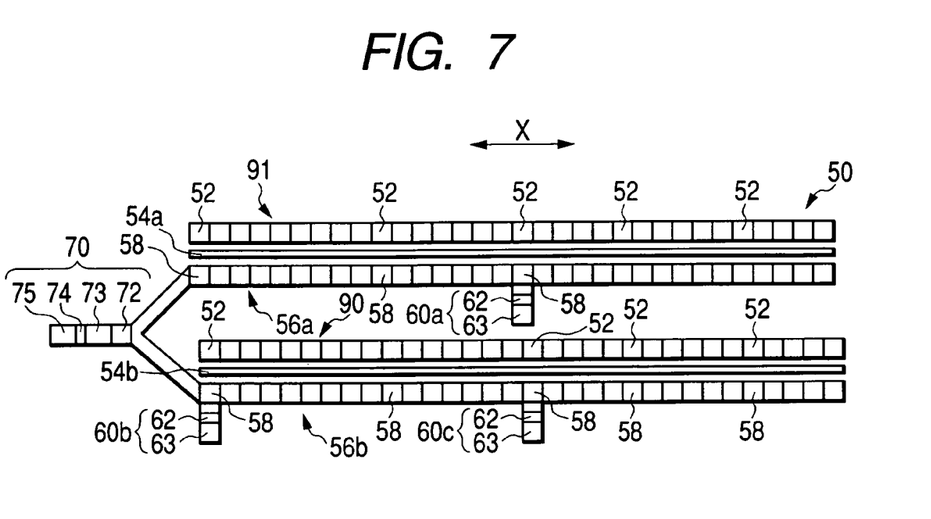
FIG. 7 is a schematic diagram showing the structure of a linear image sensor according to a second embodiment of the invention.

FIG. 7 is a schematic diagram showing the structure of a linear image sensor according to a second embodiment of the invention. In the following description, component parts substantially similar to those in the first embodiment of the invention are given like reference characters and the description thereof will be omitted.

In the sensor portion 50 of a linear image sensor according to the second embodiment of the invention, a first line of light receiving parts 91 and a second line of light receiving parts 92 are provided, in each of which numerous light receiving parts 52 are arranged in a line. The first line of light receiving parts 91 and the second line of light receiving parts 90 are disposed so that the directions of the first and second lines in which the light receiving parts 52 are arranged shift from each other by half the space of each light receiving part 52. A first transfer gate 54a and a first shift register 56a are provided in a manner adjacent to the first line of light receiving parts 91. A first electric-charge discharge portion 60a is connected to the central portion of the first shift register 56a. A second transfer gate 54b and a second shift register 56b are provided in a manner adjacent to the second line of light receiving parts 90. A second electric-charged is charge portion 60b is connected to the output-side end portion of the second shift register 56b and a third electric-charged is charge portion 60c is connected to the substantially central portion of the second shift register 56b. The first shift register 56a and the second shift register 56b are connected to the one output portion 70. The electric charge transferred by the first shift register 56a and the electric charge transferred by the second shift register 56b are alternately taken in the output portion 70. Consequently, image information of one line can be generated from the electric charge stored in the light receiving parts 52 arranged in two lines because the electric charge stored in the first line of light receiving parts 91 and what is stored in the second line of light receiving parts 90 are alternately detected by the output portion 70.

A method of driving the linear image sensor 20 according to the second embodiment of the invention is different from the method thereof according to the first embodiment of the invention in that the discharge gate pulse φe is applied to the first electric-charge discharge portion 60a, the second electric-charge discharge portion 60b and the third electric-charge discharge portion 60c. The rising and falling of the discharge gate pulse φe applied to each of the first, second and third electric-charge discharge portions 60a, 60b and 60c are the same as the case of the first embodiment of the invention.

In other words, during the period in which the electric charge stored in the light receiving parts 52 is transferred by the shift register 56 within the open-shutter period, all of the first electric-charge discharge portion 60a, the second electric-charge discharge portion 60b and the third electric-charge discharge portion 60c are shut off and the electric charge stored in the first line of light receiving parts 91 and the electric charge stored in the second line of light receiving parts 90 are alternately detected by the output portion 70.

During the time the electric charge stored in the light receiving parts 52 is transferred by the shift register 56 outside the open-shutter period, all of the first electric-charge discharge portion 60a, the second electric-charge discharge portion 60b and the third electric-charge discharge portion 60c are opened. Consequently, the electric charge stored in the light receiving parts 52 near the output portion 70 of the first line of light receiving parts 91 is discharged from the reset drain 75 of the output portion 70, whereas the electric charge stored in the light receiving parts 52 set far from the output portion 70 of the first line of light receiving parts 91 is discharged from the first electric-charge discharge portion 60a. Moreover, the electric charge stored in the light receiving parts 52 near the output portion 70 of the second line of light receiving parts 90 is discharged from the second electric-charge discharge portion 60b, whereas the electric charge stored in the light receiving parts 52 set far from the output portion 70 of the second line of light receiving parts 90 is discharged from the third electric-charge discharge portion 60c.

Therefore, according to the second embodiment of the invention, the time required to discharge the unnecessary electric charge stored outside the open-shutter period by means of the first shift register 56a and the second shift register 56b is made reducible.

Third Embodiment

Figure 8:
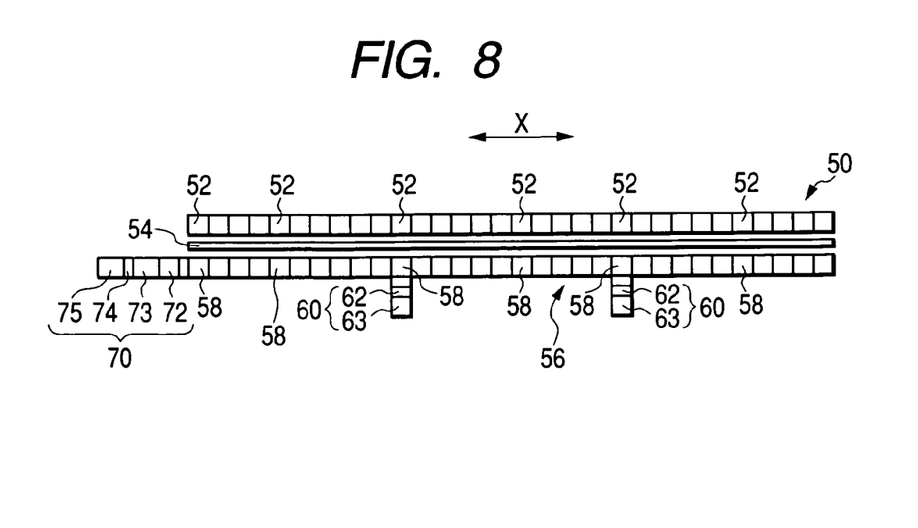
FIG. 8 is a schematic diagram showing the structure of a linear image sensor according to a third embodiment of the invention.

FIG. 8 is a schematic diagram showing the structure of the linear image sensor 20 according to a third embodiment of the invention. In the following description, component parts substantially similar to those in the first embodiment of the invention are given like reference characters and the description thereof will be omitted.

The electric-charge discharge portion 60 of the sensor portion 50 of the linear image sensor 20 is provided opposite to the transfer-gate-sides of two domains 58 located separately in the midway-portions of the shift register 56 in the main scanning direction X. In the main scanning direction X, the distance from the output-side end portion of the shift register 56 up to the electric-charge discharge portion 60 on one side, the distance from the one electric-charge discharge portion 60 up to the other electric-charge discharge portion 60 and the distance from the other electric-charge discharge portion 60 up to the non-output-side end portion of the shift register 56 are set almost nearly equal.

According to the third embodiment of the invention, the electric-charge discharge gates 62 of the two electric-charge discharge portions 60 are simultaneously opened during the period of $t_2 \leq t < t_4$. Of the whole unnecessary electric charge generated by the light receiving parts 52, the electric charge sent to the non-output-side end portion of the shift register 56 from the electric-charge discharge portion 60 near the non-output-side end portion of the shift register 56 is discharged into the electric-charge discharge portion 60 near the non-output-side end portion of the shift register 56. Further, the electric charge sent in between the two electric-charge discharge portions 60 is discharged into the electric-charge discharge portion 60 near the output-side end portion of the shift register 56. Consequently, the time required to discharge the unnecessary electric charge is reduced to roughly one third.

Fourth Embodiment

Figure 9:
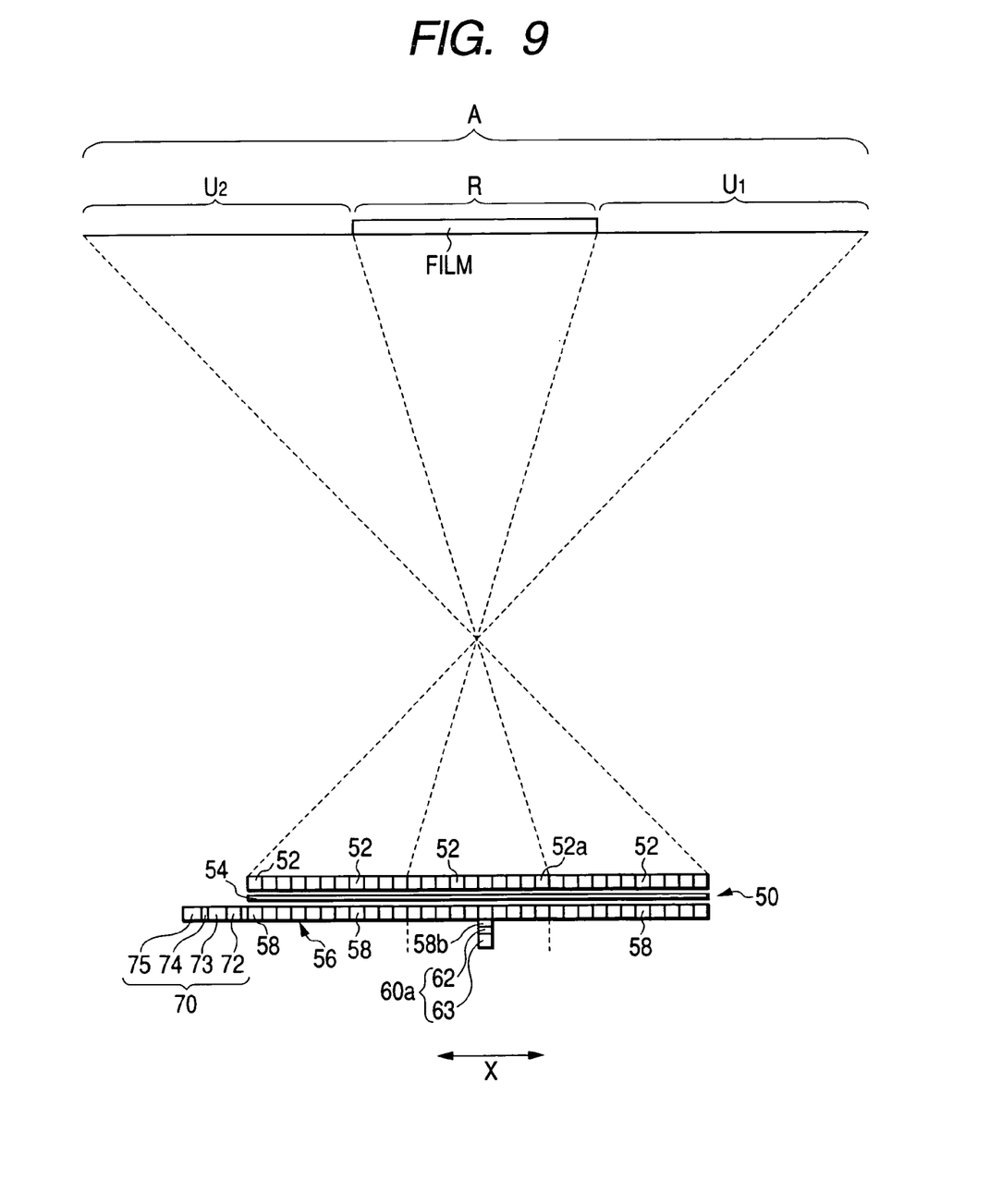
FIG. 9 is a schematic diagram explanatory of a driving method according to a fourth embodiment of the invention.
Figure 10:
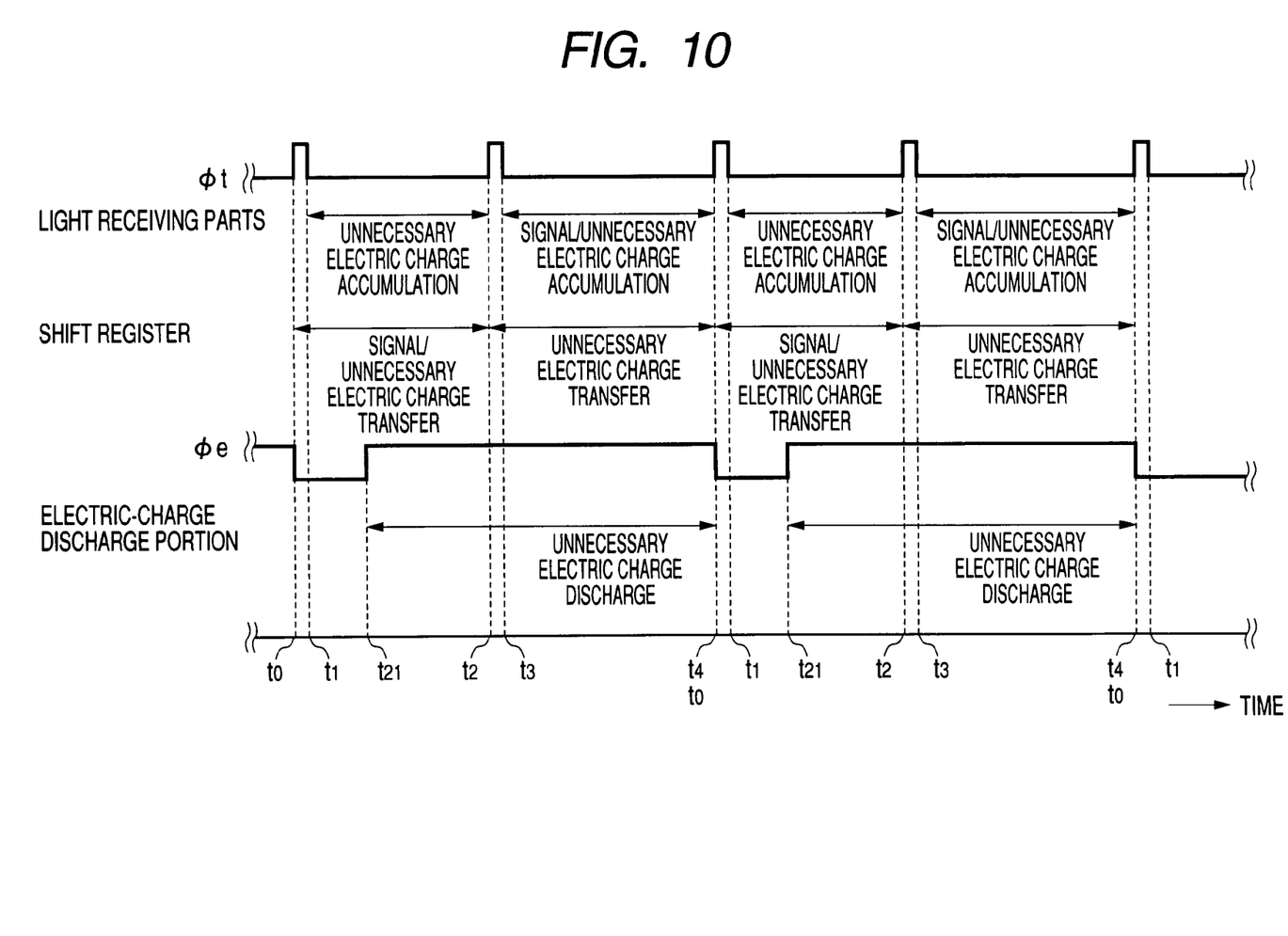
FIG. 10 is a time chart showing driving methods according to the fourth and fifth embodiments of the invention.

FIG. 9 is a schematic diagram explanatory of a method of driving the linear image sensor 20 according to a fourth embodiment of the invention. FIG. 10 is a time chart showing the method of driving the linear image sensor 20 according to the fourth embodiment of the invention. In the fourth embodiment of the invention, a description will be given of a method of reading a film using a linear image sensor similar in structure to what is described in the first embodiment of the invention, wherein component parts substantially similar to those in the first embodiment of the invention are given like reference characters and the description thereof will be omitted.

As shown in FIG. 9, an area substantially corresponding to the width of the film placed in the substantial center of the maximum reading area A of the original table 14 is set as a film reading area R according to the fourth embodiment of the invention. An image of the film reading area R is formed in the central portion of the sensor portion 50 by the optical system 30.

The driving method according to the fourth embodiment of the invention will now be described in detail.

A first operating mode for reading the film reading area R will be described by reference to FIG. 10 first.

During the open-shutter period ($t_3 \leq t < t_4$), the electric charge generated by the light receiving parts 52 is initially transferred by the shift register 56 ($t_0 \leq t < t_2$). During this period, the electric-charge discharge gate 62 is initially shut off whereby to transfer the electric charge stored in the light receiving parts 52 corresponding to the film reading area R to the output portion 70 together with the electric charge stored in the light receiving parts 52 corresponding to a non-reading area $U_1$. Then the electric-charge discharge gate 62 is opened immediately after ($t=t_{21}$) the signal charge stored in the light receiving part 52a set remotest from the output portion 70 out of the light receiving parts 52 corresponding to the film reading area R passes through the domain 58b of the shift register 56 connected to the electric-charge discharge portion 60. Thereupon, the unnecessary electric charge stored in the light receiving parts 52 corresponding to a non-reading area $U_2$ and set far from the output portion 70 is discharged from the electric-charge discharge portion 60 during a period of $t_{21} \leq t < t_2$. Thus, the unnecessary electric charge stored in the light receiving parts 52 set far from the output portion 70 is discharged from the electric-charge discharge portion 60 in the central portion of the shift register 56 at $t_{21} \leq t < t_2$, so that the time required to discharge the whole electric charge from the shift register 56 is made reducible.

At $t_2 \leq t < t_4$, further, as in the first embodiment, the unnecessary electric charge generated by the light receiving parts 52 set far from the output portion 70 is discharged from the electric-charge discharge portion 60 outside the open-shutter period ($t_1 \leq t < t_2$). Therefore, the time required to discharge the unnecessary electric charge stored in the light receiving parts 52 outside the open-shutter period is made reducible.

A second operating mode for reading the maximum reading area A will be described next. In the second operating mode, the electric-charge discharge gate 62 is always shut off when the electric charge stored in the light receiving parts 52 within the open-shutter period is transferred by the shift register 56. The whole electric charge stored in the light receiving parts 52 within open-shutter period is thereby transferred up to the output portion 70. Incidentally, part of the unnecessary electric charge stored in the light receiving parts 52 outside the open-shutter period may be discharged from the electric-charge discharge portion 60 as in the case of the first embodiment of the invention or the whole of the unnecessary electric charge may be discharged from the reset drain 75.

Fifth Embodiment

Figure 11:
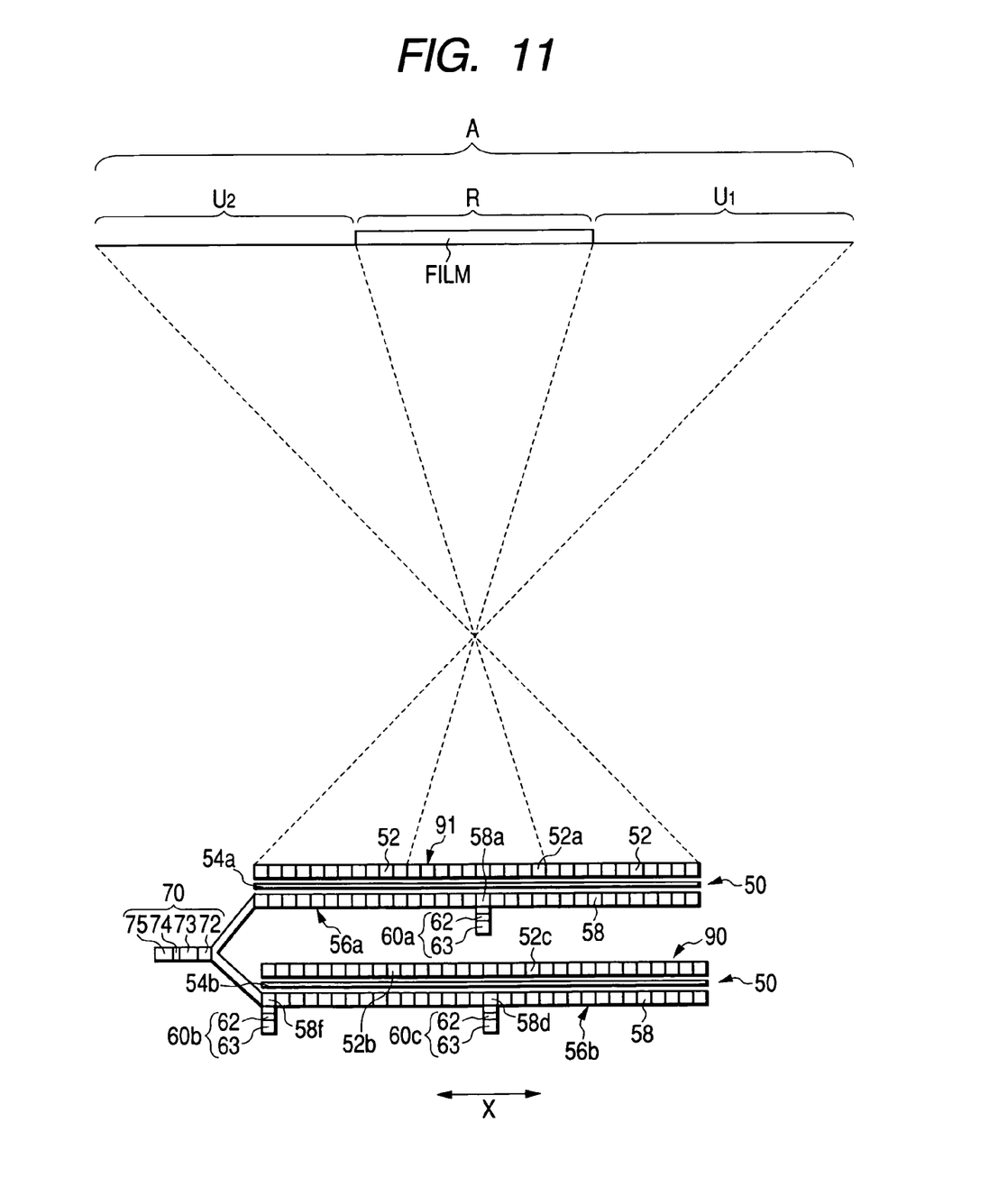
FIG. 11 is a schematic diagram explanatory of the driving method according to the fifth embodiment of the invention.
Figure 12:
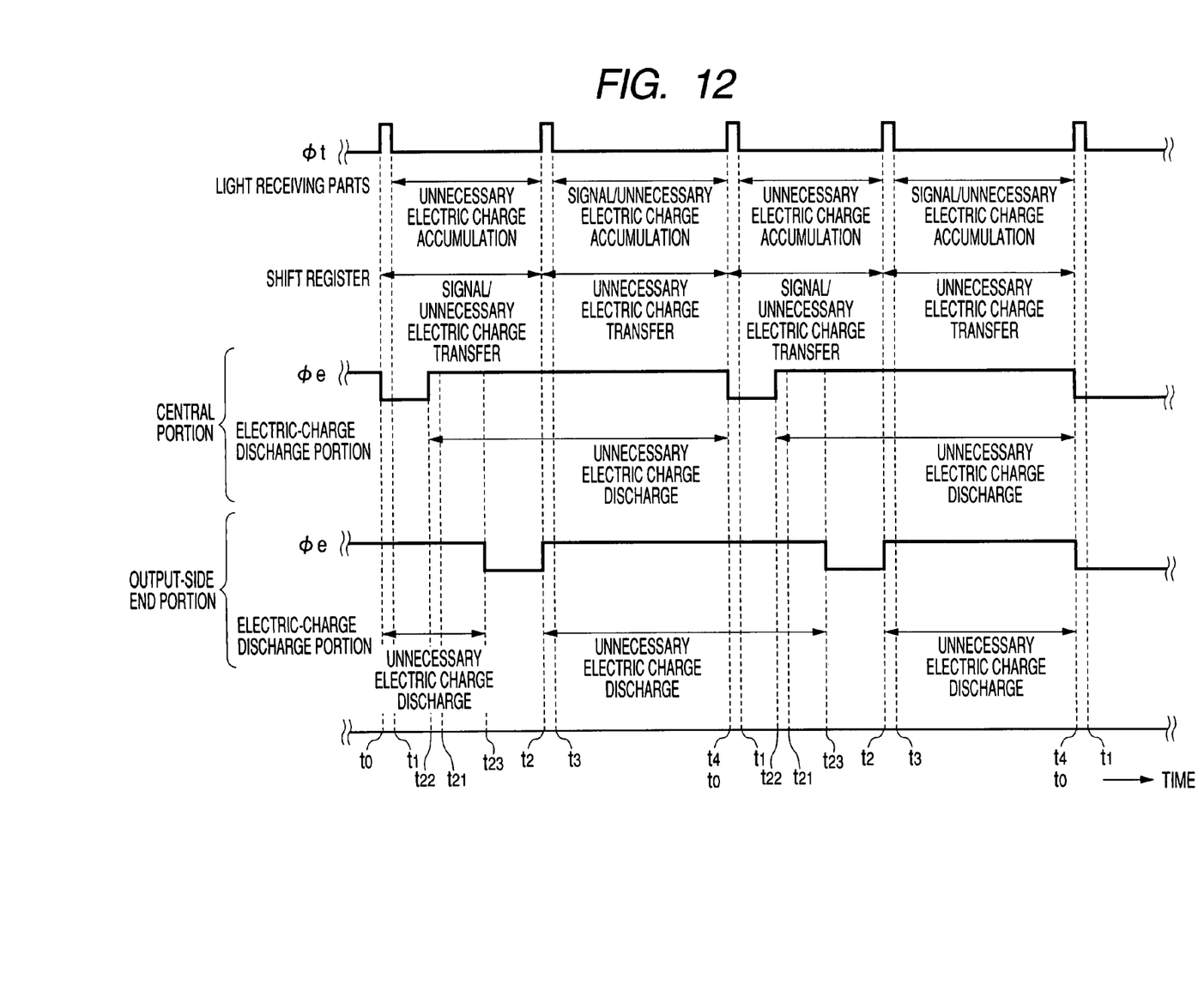
FIG. 12 is a time chart showing the driving method according to the fifth embodiment of the invention.

FIG. 11 is a schematic diagram explanatory of a method of driving the linear image sensor 20 according to a fifth embodiment of the invention. FIG. 12 is a time chart showing the method of driving the linear image sensor 20 according to the fifth embodiment of the invention. In the fifth embodiment of the invention, a description will be given of a method of reading the film reading area R described in the fourth embodiment using a linear image sensor similar in structure to what is described in the second embodiment of the invention.

The driving method according to the fifth embodiment of the invention will now be described in detail.

As shown in FIG. 12, during the period of $t_0 \leq t < t_2$, the electric charge generated by the light receiving parts 52 of the lines of light receiving parts 90 and 91 during the open-shutter period ($t_3 \leq t < t_4$) is transferred by the shift register 56.

During the period of $t_0 \leq t < t_2$, the electric-charge discharge gate 62 of the first electric-charge discharge portion 60a is initially shut off. The electric-charge discharge gate 62 of the first electric-charge discharge portion 60a is opened immediately after the signal charge stored in the light receiving part 52a set remotest from the output portion 70 out of the light receiving parts 52 of the first line of light receiving parts 91 corresponding to the film reading area R passes through the domain 58a of the first shift register 56a connected to the first electric-charge discharge portion 60a. Consequently, the electric charge stored in the light receiving parts 52 corresponding to the film reading area R of the first line of light receiving parts 91 together with the electric charge stored in the light receiving parts 52 corresponding to the non-reading area $U_1$ of the second line of light receiving parts 90 is transferred up to the output portion 70. Moreover, the electric charge stored in the light receiving parts 52 corresponding to the non-reading area $U_2$ of the first line of light receiving parts 91 is discharged from the first electric-charge discharge portion 68a.

During the period of $t_0 \leq t < t_2$, initially, the electric-charge discharge gate 62 of the second electric-charge discharge portion 60b is opened and the electric-charge discharge gate 62 of the third electric-charge discharge portion 60c is shut-off. Then the electric-charge discharge gate 62 of the second electric-charge discharge portion 60b is shut off immediately after the signal charge stored in the light receiving part 52b set remotest from the output portion 70 out of the light receiving parts 52 of the second line of light receiving parts 90 corresponding to the non-reading area $U_1$ passes through the domain 58f of the second shift register 56b connected to the second electric-charge discharge portion 60b ($t=t_{23}$). Moreover, the electric-charge discharge gate 62 of the third electric-charge discharge portion 60c is opened immediately after the signal charge stored in the light receiving part 52c set remotest from the output portion 70 out of the light receiving parts 52 of the second line of light receiving parts 90 corresponding to the film reading area R passes through the domain 58d of the second shift register 56b connected to the third electric-charge discharge portion 60c. Consequently, the electric charge stored in the light receiving parts 52 corresponding to the non-reading area $U_1$ of the second line of light receiving parts 90 is discharged from the second electric-charge discharge portion 60b. The signal charge stored in the light receiving parts 52 corresponding to the film reading area R of the second line of light receiving parts 90 is discharged from the reset drain 75 after being transferred up to and detected by the output portion 70. The electric charge stored in the light receiving parts 52 corresponding to the non-reading area $U_2$ of the second line of light receiving parts 90 is discharged from the third electric-charge discharge portion 60c.

Thus, during the period of $t_0 \leq t < t_2$, the unnecessary electric charge stored by the light receiving parts 52 set far from the output portion 70 corresponding to the non-reading area $U_2$ is discharged from the first electric-charge discharge portion 60a and the third electric-charge discharge portion 60c, whereby the time required to discharge the whole electric charge stored in the light receiving parts 52 within the open-shutter period is made reducible.

At $t_2 \leq t < t_4$, the electric charge stored outside the open-shutter period ($t_0 \leq t < t_3$) is transferred by the shift register as in the case of the second embodiment of the invention. Consequently, the unnecessary electric charge generated by the light receiving parts 52 set far from the output portion 70 outside the open-shutter period is discharged from the first electric-charge discharge portion 60a and the third electric-charge discharge portion 60c.

Although the plurality of embodiments of the invention have been described until now, any linear image sensor other than the linear image sensor 20 is applicable to the invention. In the plurality of embodiments of the invention described above, moreover, though the shift register 56 and the electric-charge discharge portion 60 are provided on only one side along the line of light receiving parts 52, the shift register 56 and the electric-charge discharge portion 60 may be provided on both sides of and along the line of light receiving parts 52 so that the reading of the electric charge is carried out on both sides thereof. In the plurality of embodiments of the invention described above, further, though the linear image sensor 20 as an imaging device has been applied to the flat bed type image scanner 10 by way of example, the invention may be applied to the imaging device of an image input apparatus such as a sheet feed type image scanner, a copying machine, a composite machine, a digital camera and so forth.

What is claimed is:

1. An imaging device comprising:
    a plurality of light receiving parts for generating electric charge by photoelectric conversion;
    a shift register for transferring the electric charge generated by the plurality of light receiving parts to the output-side end portion of the shift register; and
    an electric-charge discharge portion which is provided in a midway-portion of the shift register and includes an electric-charge discharge gate for controlling import of the electric charge from the shift register for discharging the electric charge of the shift register via the electric-charge discharge gate, wherein:
    the electric-charge discharge gate is shut off when the electric charge stored in the plurality of light receiving parts is transferred by the shift register within an open-shutter period; and
    the electric-charge discharge gate is opened when the electric charge stored in the plurality of light receiving parts is transferred by the shift register outside the open-shutter period.

2. An imaging device according to claim 1, wherein the electric-charge discharge portion is provided in a central portion of the shift register.

3. An imaging device according to claim 1, wherein a plurality of electric-charge discharge portions are provided in the midway-portion of the shift register.

4. A method of driving an imaging device including: a plurality of light receiving parts for generating electric charge by photoelectric conversion; a shift register for transferring the electric charge generated by the plurality of light receiving parts to the output-side end portion of the shift register; and an electric-charge discharge portion which is provided in a midway-portion of the shift register and includes an electric-charge discharge gate for controlling import of the electric charge from the shift register for discharging the electric charge of the shift register via the electric-charge discharge gate, the method comprising the steps of:
    shutting off the electric-charge discharge gate when the electric charge stored in the plurality of light receiving parts is transferred by the shift register within an open-shutter period; and
    opening the electric-charge discharge gate when the electric charge stored in the plurality of light receiving parts is transferred by the shift register outside the open-shutter period.

5. A method of driving an imaging device a plurality of light receiving parts for generating electric charge by photoelectric conversion; a shift register for transferring the electric charge generated by the plurality of light receiving parts to the output-side end portion of the shift register; and an electric-charge discharge portion which is provided in a midway-portion of the shift register and includes an electric-charge discharge gate for controlling import of the electric charge from the shift register for discharging the electric charge of the shift register via the electric-charge discharge gate, the method comprising the steps of:
    shutting off the electric-charge discharge gate in such an operating mode that the electric charge generated by substantially all of the plurality of light receiving parts is utilized when the electric charge stored in the plurality of light receiving parts is transferred by the shift register within the open-shutter period; and
    opening the electric-charge discharge gate in such an operating mode that the electric charge generated by the plurality of light receiving parts is partially utilized when the electric charge stored in the plurality of light receiving parts is transferred by the shift register within the open-shutter period.

* * * * *